April 4, 1950          C. D. BARNES          2,502,696
MOWER
Filed June 24, 1946          2 Sheets-Sheet 1
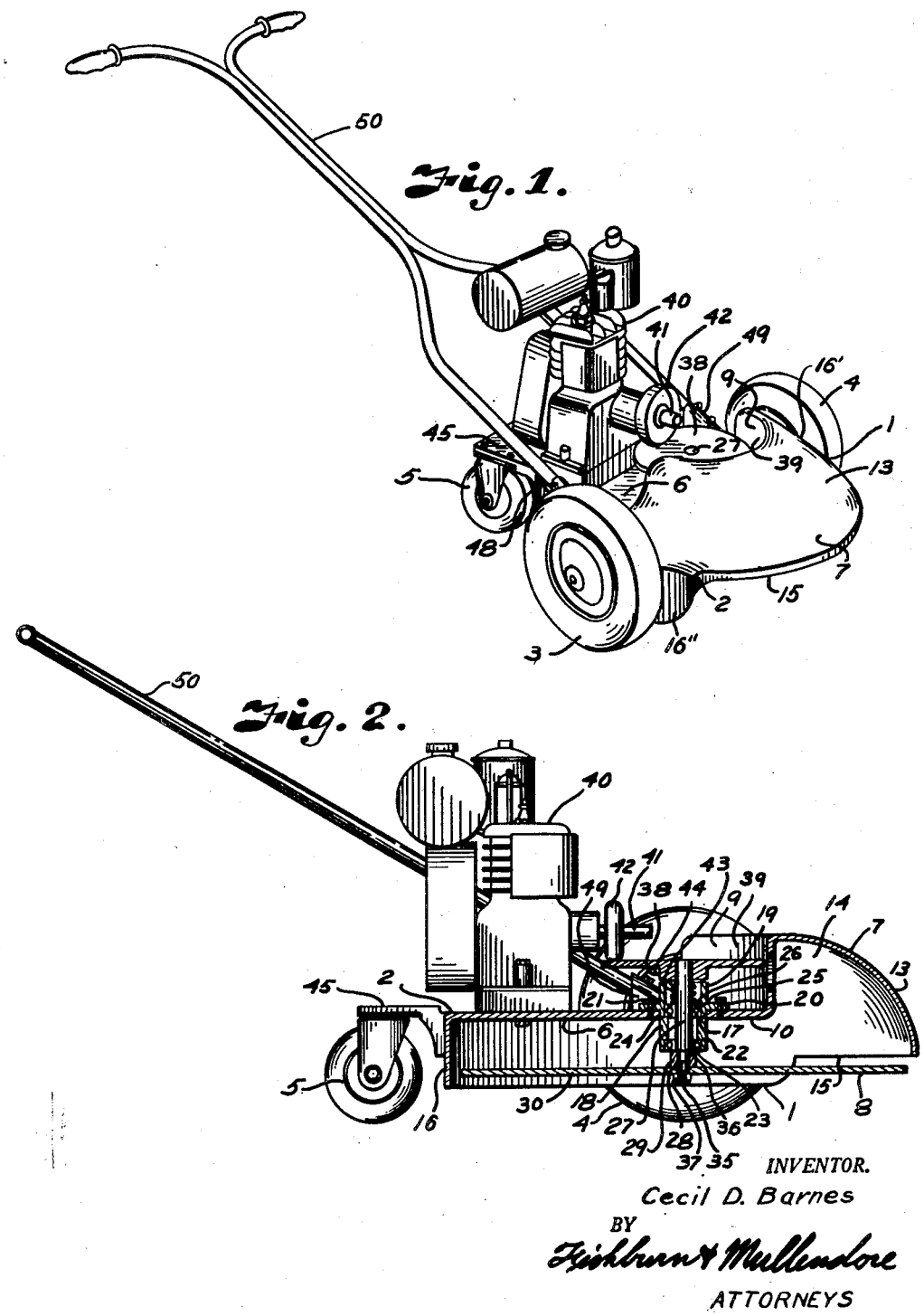
INVENTOR.
Cecil D. Barnes
BY
Fishburn & Mullendore
ATTORNEYS April 4, 1950     C. D. BARNES     2,502,696
MOWER
Filed June 24, 1946     2 Sheets-Sheet 2
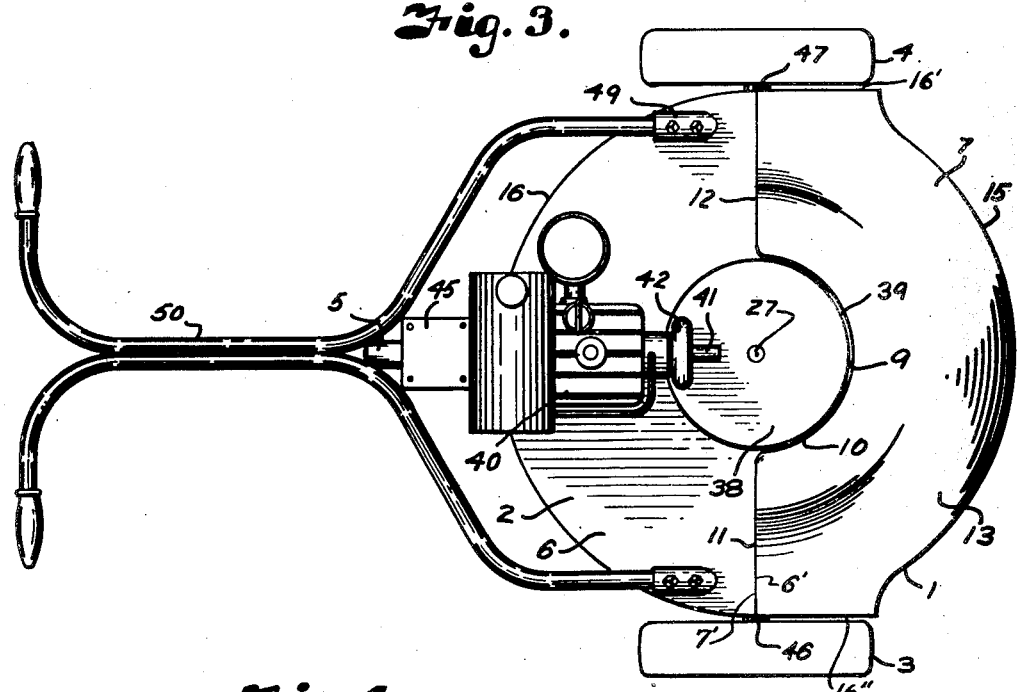
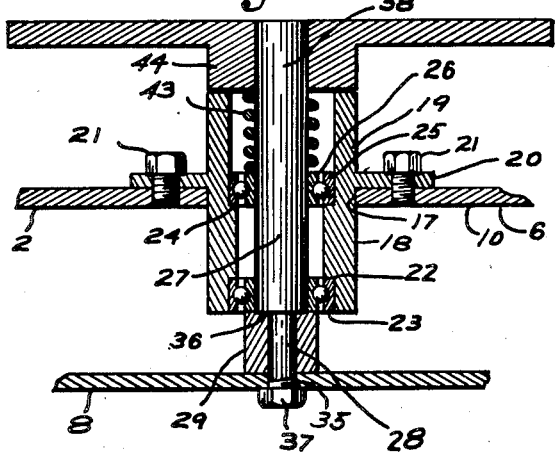
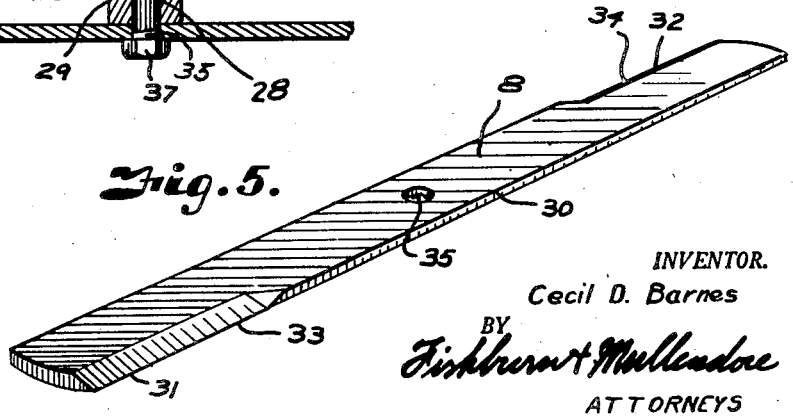
INVENTOR.
Cecil D. Barnes
BY
Fishburn & Mullendoe
ATTORNEYS Patented Apr. 4, 1950

2,502,696

UNITED STATES PATENT OFFICE 2,502,696

MOWER

Cecil D. Barnes, Kansas City, Mo.

Application June 24, 1946, Serial No. 678,918

5 Claims. (Cl. 56—25.4)

This invention relates to a mower for cutting grass and similar vegetation and has for its principal object to provide a power mower of the rotary type wherein the housing for the rotary cutter is shaped for producing a low pressure area above the cutter for lifting grass and drawing it into contact with the cutter thereby permitting a substantially level cut across a swath.

Other objects of the invention are to provide a power mower that is of simple and inexpensive construction; to provide a friction drive between the motor and the cutter; to provide a cutter mounting which maintains frictional contact between the driving and driven members; to provide a rotor housing having depending side and rear walls extending below the cutter for promoting safety of operation; to provide a substantial seal of the air currents generated responsive to rotation of the cutter and for effecting discharge in a manner to induce the low pressure zone above the cutters; and to provide a housing which permits ready entrance of the grass to be cut and which provides complete protection of the rotor blades.

In accomplishing these and other objects of the invention, I have provided improved structure, the preferred form of which is illustrated in the accompanying drawings wherein:

Fig. 1 is a perspective view of a mower constructed in accordance with the present invention.

Fig. 2 is a longitudinal sectional view through the mower showing the motor in elevation.

Fig. 3 is a plan view of the mower.

Fig. 4 is an enlarged vertical section through the rotor, the bearing supports for the rotor shaft, and the frictional drive.

Fig. 5 is a perspective view of the rotary cutter.

Referring more in detail to the drawings:

1 designates a mower embodying the features of the present invention and which includes a frame 2 supported at the sides by wheels 3 and 4 and at the rear by a caster wheel 5. The frame 2 includes a substantially horizontal platform portion 6 of substantially semi-circular shape and a forwardly extending hood portion 7 also of substantially semi-circular shape with diametrical sides 6' and 7' thereof coinciding to form a circular top cover for a rotor 8. The portion 7 is connected with the diametrical side of the platform portion by a transverse wall which includes an arcuate wall portion 9 extending vertically from a forward semi-circular continuation 10 of the platform portion and which terminates in laterally extending wall portions 11 and 12 (Fig. 3) that terminate at the outer diametrical sides of the frame in substantially transverse alignment with the axis of rotor rotation. The forward portion 7 extends from the wall portions 9, 11 and 12 and curves outwardly and downwardly over the rotor as indicated at 13 (Fig. 2) so as to provide a chamber 14 extending over the front of the rotor for directing flow of air generated by the rotor in a manner to produce a low pressure area between the lower edge 15 of the hood and the rotor for a purpose later described. In Fig. 2 it will be noted that the edge 15 is spaced slightly forward and above the tips of the rotor blades. The sides 16' and 16'' of the portion 7 of the frame and the platform portion 6 have a depending wall or skirt 16 terminating slightly below the cutter for forming a guard and confining the air currents generated by the rotor.

Formed in the platform portion 6 in the axis of rotation of the cutter is an opening 17 for mounting a bearing housing 18 best shown in Fig. 4. The bearing housing 18 includes a sleeve-like body 19 having an annular flange 20 intermediate its upper and lower ends for support on the upper face of the platform portion 6 of the frame and which is secured thereto by fastening devices 21. The sleeve-like body, therefore, extends above and below the level of the platform portion of the frame and the lower end is provided with an internal annular seat 22 for mounting the outer race of an anti-friction bearing 23. A similar opposite facing bearing seat 24 is provided in the sleeve and spaced at substantially the level of the platform section of the frame for mounting the outer race 25 of a similar anti-friction bearing 26. Carried by the inner races of the bearings 23 and 26 is a shaft 27. The lower end of the shaft 27 has a reduced extension 28 for mounting the hub 29 of the rotor 8.

The rotor 8 has a substantially bar-like body 30 of desired width and thickness and which has the edges at the ends thereof bevelled as at 31 and 32 to act as fan surfaces and cutting blades 33 and 34 rotatable in a horizontal plane. The blades of rotor are of sufficient length so that they rotate freely within the skirt 16 and the central portion has an opening 35 registering with the hub opening for mounting the rotor on the reduced extension 28 of the shaft 27. The rotor is retained in position on the reduced extension of the shaft and clamped against the shoulder 36 of the shaft by a nut 37 threaded onto the reduced extension and engaging the underside of the rotor as best shown in Fig. 4.

The shaft projects above the upper end of the sleeve-like body of the bearing housing and carries a friction disk 38 that is fixed thereto and rotates within the recess 39 formed by the arcuate wall 9. Mounted on the platform section at the rear thereof is a motor 40 which may be an internal combustion engine (as shown) or an electric motor and which has a power shaft 41 extending forwardly over the friction disk to carry a driving wheel 42 having contact with the friction disk as best shown in Fig. 6.

The shaft is adapted to have some longitudinal movement in the bearings 23 and 26 as limited by the length of the bearing portion of the shaft which is shown as slightly longer than the sleeve-like body 19. This movement permits the friction disk 38 to be retained in yielding contact with the driving wheel 42 by a coil spring 43 sleeved on the shaft 27 and having one end bearing against the inner race of the upper bearing 26 and its upper end bearing against a hub 44 of the friction disk 38. The caster wheel 5 is carried by a bracket 45 extending rearwardly from the wall or skirt 16 at a point in the longitudinal center of the frame as best shown in Figs 2 and 3. The wheels 3 and 4 may be mounted on suitable spindles 46 and 47 extending outwardly from the forward portions of the depending wall 6 as shown in Fig. 3.

The bracket 45 and spindles 46 and 47 may be adjustable on the frame to position the height of the frame and rotary cutter carried thereby.

The frame of the mower has lugs 48 and 49 on opposite sides of the platform section to mount a handle 50 by which the mower may be propelled over the ground to be cut.

In using the mower constructed and assembled as described, the operator starts the motor 40 so that the driving wheel 42 on the power shaft drives the friction disk 38 and effects rotation of the rotary cutter 8 in an anti-clockwise direction (Fig. 3) at substantially high speed. The mower is pushed over the ground by means of the handle 50, whereby the cutter is moved into contact with the grass as the hood portion of the frame passes thereover.

Rotation of the cutter 8 produces a considerable wind blast and acts as an impeller to build up a pressure within the rotor chamber directly below the platform portion 6 which travels along the inner face of the wall 16. Since the wall 16 forms a substantial seal with the grass, the escape for the air is under the hood portion near the center line of the mower. When the air breaks into the hood it moves downwardly under the curving surface and is discharged forwardly of the cutter under the edge 15 to induce a low pressure area or zone directly above the forward path of the cutter to effect drawing in and straightening of the grass over which the machine is propelled. The grass is thus substantially retained in erect position while being severed through rotation of the rotor.

After the grass is cut the low pressure area is not sufficient to maintain the grass in suspension and the grass drops to the ground across the width of the swath. The air breaking over the lower portion of the walls 9, 11 and 12 travels along the underface of the hood portion 13 and is discharged forwardly of the cutter so that it does not interfere with entrance of the grass.

From the foregoing it is obvious that I have provided a mower which is of simple construction and which is designed to raise the grass to be cut and assure an even cut across the width of the swath. It is also obvious that I have provided a mower having a simple driving connection between the motor and the rotor and that the driven disk is maintained in substantially positive contact with the driving wheel so as to avoid slippage, however, should the cutter strike an object, the spring will yield sufficiently so that the driving wheel slides on the friction disk, thereby avoiding damaging of the cutter.

What I claim and desire to secure by Letters Patent is:

1. In a mower provided with a rotary cutter having blades adapted to rotate in a substantially horizontal path about a vertical axis, a wheel supported frame having a horizontal platform portion adapted to carry a prime mover for actuating the rotary cutter, a transverse wall extending upwardly at the front of said platform portion, and a hood portion having a top extending outwardly and downwardly from the upper portion of the transverse wall and terminating in an edge spaced slightly forward and above the path of the blades, said hood portion cooperating with the platform portion in providing a cover for the rotary cutter and providing an air chamber over the path of the front portion of the blades to accommodate the blast of air produced by rotation of the cutter blades and effect a low pressure area along said edge for facilitating entrance of grass into contact with the rotary cutter when the mower is in operation.

2. In a mower provided with a rotary cutter having blades adapted to rotate in a substantially horizontal path about a vertical axis, a wheel supported frame having a substantially semi-circular horizontal platform portion adapted to carry a prime mover for actuating the rotary cutter, a transverse wall extending upwardly at the platform portion, and a semi-circular hood portion extending outwardly and downwardly from the upper portion of the transverse wall and having a forward edge terminating slightly forwardly and above the path of the blades, said hood portion cooperating with the platform portion in forming a substantially circular covering for the rotary cutter and providing an air chamber over the path of the front portion of the blades to accommodate the blast of air produced by rotation of the cutter blades and forming a low pressure area under said edge for facilitating entrance of grass into contact with the rotary cutter when the mower is in operation.

3. In a mower provided with a rotary cutter having blades adapted to rotate in substantially a horizontal path about a vertical axis, a wheel supported frame having a substantially semi-circular horizontal platform portion adapted to carry a prime mover for actuating the rotary cutter and having a diametrical side forward thereof and extending transversely, a smaller semi-circular extension projecting forwardly of said diametrical side, a transverse wall including a portion extending upwardly around the semi-circular extension to accommodate a support for the rotary cutter and portions extending laterally therefrom along said diametrical side to sides of said frame, and a semi-circular hood portion extending outwardly and downwardly from the upper portion of the transverse wall and having a forward edge terminating slightly forwardly and above the path of the blades, said hood portion cooperating with the platform portion in forming a substantially circular covering for the rotary cutter and providing an air chamber over the path of the front portion of the blades to accommodate the blast of air produced by rotation of the cutter blades and forming a low pressure area under said edge for facilitating entrance of grass into contact with the rotary cutter when the mower is in operation.

4. In a mower provided with a rotary cutter having blades adapted to rotate in a substantially horizontal plane about a vertical axis, a frame having a horizontal platform portion adapted to support a prime mover for actuating the rotary cutter, a transverse wall extending upwardly of the front of the platform portion, a hood portion having a top extending outwardly and downwardly from the upper portion of the transverse wall and terminating in an edge spaced slightly forward and above the path of the blades, said hood portion cooperating with the platform portion in forming a cover for the rotary cutter and providing an air chamber over the path of the front portion of the blades to accommodate the blast of air produced by rotation of the cutter blades and effect a low pressure area along said edge for facilitating entrance of grass to be cut when the mower is in operation, and a skirt depending at sides of said portions and across the rear of the platform portion.

5. In a mower provided with a rotary cutter having blades adapted to rotate in a substantially horizontal plane about a vertical axis, a frame having a horizontal platform portion adapted to support a prime mover for actuating the rotary cutter, a transverse wall extending upwardly of the front of the platform portion, a hood portion having a top extending outwardly and downwardly from the upper portion of the transverse wall and terminating in an edge spaced slightly forward and above the path of the blades, said hood portion cooperating with the platform portion in forming a cover for the rotary cutter and providing an air chamber over the path of the front portion of the blades to accommodate the blast of air produced by rotation of the cutter blades and effect a low pressure area along said edge for facilitating entrance of grass to be cut when the mower is in operation, a skirt depending at sides of said portions and across the rear of the platform portion, wheels carried by the skirt at the sides, a bracket projecting from said rear skirt portion, and a caster wheel carried by said bracket.

CECIL D. BARNES.

REFERENCES CITED

The following references are of record in the file of this patent:

UNITED STATES PATENTS

| Number | Name | Date |
|---|---|---|
| 1,880,154 | Rotondo et al. | Sept. 27, 1932 |
| 2,017,524 | Bolens | Oct. 15, 1935 |
| 2,278,922 | Goodall | Apr. 7, 1942 |